United States Patent

Kobayashi

[11] Patent Number: 5,104,358
[45] Date of Patent: Apr. 14, 1992

[54] BICYCLE FRONT DERAILLEUR
[75] Inventor: Jun Kobayashi, Sakai, Japan
[73] Assignee: Maeda Industries, Ltd., Osaka, Japan
[21] Appl. No.: 752,179
[22] Filed: Aug. 23, 1991

Related U.S. Application Data

[63] Continuation of Ser. No. 572,418, Aug. 27, 1990, abandoned.

Foreign Application Priority Data

Sep. 5, 1989 [JP] Japan .................. 1-104259[U]

[51] Int. Cl.$^5$ .................................................. F16H 59/00
[52] U.S. Cl. ................................................... 474/82
[58] Field of Search ............................ 474/80, 82, 140

[56] References Cited

U.S. PATENT DOCUMENTS

| | | | |
|---|---|---|---|
| 3,813,955 | 6/1974 | Huret et al. | 474/82 |
| 3,890,847 | 6/1975 | Dian | 474/80 |
| 4,030,374 | 6/1977 | Isobe | 474/80 |
| 4,194,409 | 3/1980 | Nagano | 474/80 |
| 4,279,172 | 7/1981 | Nagano et al. | 474/82 |
| 4,516,961 | 5/1985 | Coue | 474/80 |
| 4,604,078 | 8/1986 | Nagano | 474/80 |
| 4,674,995 | 6/1987 | Iwasaki et al. | 474/80 |
| 4,756,704 | 7/1988 | Nagano | 474/82 X |

*Primary Examiner*—Ramon S. Britts
*Assistant Examiner*—Roger J. Schoeppel
*Attorney, Agent, or Firm*—William H. Eilberg

[57] ABSTRACT

The present invention provides a bicycle front derailleur comprising a base member fixed to the seat tube of a bicycle frame, an inner link member, an outer link member, and a movable member having a chain guide, these members being interconnected by pins to form a parallelogrammatic pantographic link mechanism. The link mechanism is biased by a spring so as to return the movable member toward a smallest sprocket of a multiple chainwheel included in a multi-chainwheel assembly, and is deformed against the spring by a cable for a speed change. The cable is connected to the free end of an actuating arm extending from the upper end of the inner link member toward the outer link member to upwardly pull and pivotally move the actuating arm.

The actuating arm therefore forms no upward projection beyond the link mechanism, while the cable can be made to extend upward to a shift lever over a shortened distance with a reduced number of bent portions.

9 Claims, 3 Drawing Sheets

BICYCLE FRONT DERAILLEUR

This application is a continuation of application Ser. No. 07/572,418, filed Aug. 27, 1990, now abandoned.

BACKGROUND OF THE INVENTION

1. Field of the Invention

The present invention relates to bicycle front derailleur for shifting a chain from one sprocket to another of a multiple chainwheel to perform thereby an intended speed change.

2. Description of the Prior Art

A bicycle front derailleur is mounted on the bicycle usually in combination with a rear derailleur which is used for shifting the chain from one sprocket to another of a multiple freewheel (rear gear). When the chain engages a larger chainwheel sprocket and a smaller freewheel sprocket, a greater gear ratio will result to enable one to ride the bicycle at high speed. Conversely, a combination of a smaller chainwheel sprocket with a larger freewheel sprocket gives a lower gear ratio, permitting one to ride at a lower speed but with a higher torque.

Generally, the front derailleur for bicycles includes a chain guide having an inner guide plate and an outer guide plate which are disposed at opposite sides of the chain at the position where the chain advances into engagement with the multiple chainwheel. The derailleur is adapted to translate the chain guide widthwise of the chain, i.e., laterally of the bicycle. A parallelogrammatic pantographic link mechanism is used for moving the chain guide in this way as disclosed, for example, in U.S. Pat. No. 4,674,995, FIG. 6. When the rider manipulates a shift lever on the bicycle frame, the pantographic link mechanism is deformed through a cable to thereby translate the chain guide laterally. As a result, the inner or outer guide plate of the chain guide pushes the chain laterally, whereby the chain in engagement with one sprocket of the chainwheel is shifted to another sprocket to change the speed of the bicycle.

With reference to FIG. 3, a more specific description will be given of the mechanism for shifting the chain guide of the conventional bicycle front derailleur. The parallelogrammatic pantographic link mechanism, indicated at 10, comprises four members, i.e., a base member 2 fixed to the seat tube 1 of a bicycle by a clamp band, inner and outer link members 3, 4 pivoted to the base member 2 at their 5 upper base ends 3a, 4a by pins 5, 6, respectively, and a movable member 9 pivoted to the lower ends of the inner and outer link members 3, 4 by pins 7, 8, respectively. The four pins 5, 6, 7, 8 pivotally connecting the four members together are disposed at positions corresponding to the four corners of a parallelogram. Thus, when the link mechanism 10 deforms, the movable member 9 translates laterally inward or outward. The movable member 9 is integrally formed with a chain guide 11 comprising an inner guide plate 11a and an outer guide plate 11b. The inner guide plate 11a and the outer guide plate 11b are generally in parallel to each other and spaced apart by a distance permitting a chain C to pass therebetween.

The link mechanism 10 is always biased by a spring 12 so as to move the chain guide 11 laterally inward, i.e., toward a smaller sprocket Sa. The outer link member 4 is integrally provided at its upper end with an actuating arm 13 extending upward obliquely inward and having its free end connected to one end of a cable 14. The cable 14 extends along the frame and is connected to a shift lever so positioned as to be readily movable by the rider.

The shift lever is pivotally movable to pull or pay out the cable, thereby to move the cable longitudinally thereof.

Accordingly, when the rider manipulates the shift lever to pull the cable 14 in the direction of arrow P in FIG. 3, the link mechanism 10 deforms against the elastic force of a spring 12, shifting the chain guide 11 in the direction of arrow p, whereby the chain C, engaging the smaller sprocket Sa is pushed by the inner guide plate 11a into engagement with a larger sprocket Sb. Conversely, when the chain C engaging the larger sprocket Sb is to be shifted to the smaller sprocket Sa, the shift lever is pivoted in the opposite direction to pay out the cable 14. This causes the link mechanism 10 to restore itself by being biased by the spring 12 while being regulated by the payout amount of the cable 14 in the direction of arrow Q thereby returning the chain guide 11 in the direction of arrow q. At this time, the chain C is pushed by the outer guide plate 11b into engagement with the smaller sprocket Sa.

Thus, the conventional front derailleur shown in FIG. 3 is adapted to deform the link mechanism 10 by downwardly pulling the cable 14 attached to the free end of the actuating arm 13 which extends obliquely upward from the upper end of the outer link member 4. Accordingly, the derailleur has the following drawbacks.

First, the actuating arm 13 projects upward from the pantographic link mechanism 10, so that there is a hazardous likelihood that the garment of the rider will be caught by the arm 13 or the end of the cable 14 attached thereto.

Second, the actuating arm 13 is adapted to be pulled downward, so that the cable 14 connected thereto needs to extend downward to the bottom lug (crank axle support portion) of the bicycle frame and then to be greatly bent to extend along the downtube of the frame to the shift lever, hence a complex cable arrangement. This entails the following problems. Since the cable as greatly bent at an intermediate portion must be pulled longitudinally thereof, the cable encounters great resistance when pulled, is not smoothly movable and fatigues or breaks relatively easily. Because the cable extending from the front derailleur to the shift lever has a relatively large length, the longitudinal elastic elongation of the cable impairs the responsiveness of the derailleur to the manipulation of the shift lever. Further since the cable extends near the bottom lug, the wheel is liable to splash the cable with mud to result in the problem of accelerated deterioration of the cable due to corrosion or the like.

SUMMARY OF THE INVENTION

Accordingly, an object of the present invention is to overcome all the foregoing problems of the conventional device by a simple construction.

To fulfill the above object, the present invention provides a bicycle front derailleur mountable to a seat tube of a bicycle frame for fitting a chain around a selected sprocket of a multiple chainwheel by pushing the chain laterally at a portion thereof advancing into engagement with the chainwheel, the front derailleur comprising:

a base member fixed to the seat tube, member pivoted at its upper end to the base member by a pin to be movable laterally of the bicycle, an outer link member disposed laterally outwardly of the inner link member and pivoted at its upper end to the base member by a pin to be movable laterally of the bicycle, and a movable member pivoted to the lower end of the inner and outer link members by respective pins, the pins being arranged at the respective corners of a parallelogram so that the base member, inner link member, outer link member and movable member connected together by the pins form a deformable parallelogrammatic pantographic link mechanism, the movable member being provided with a chain guide comprising an inner guide plate and an outer guide plate, the inner and outer guide plates being opposed to each other and with the chain positioned therebetween the link mechanism being biased by a spring so as to return the movable member laterally inward, the inner link member having an upper end provided with an actuating arm extending laterally outward toward the outer link member, the actuating member having a free end connected to a cable for pulling the actuating arm upward.

With the front derailleur of the present invention, the actuating arm connected to the cable extends from the upper end of the inner link member toward the outer link member instead of projecting upward beyond the pantographic link mechanism like the conventional actuating arm. The present derailleur is therefore free of the problem that the garment of the rider will be caught by the projecting arm or the cable end connected to the actuating arm.

Furthermore, the pantographic link mechanism is deformable against the spring by upwardly pulling the actuating arm extending from the upper end of the inner link member outward as described above, so that the cable attached to the actuating arm can be made to extend upward directly along the seat tube to a shift lever over a relatively short distance without being greatly bent. This reduces the resistance to be encountered when the cable is pulled by the shift lever, assures the derailleur of improved responsiveness to the manipulation of the shift lever and eliminates the likelihood that the cable will be exposed to the mud splashed about by the wheel. Moreover, the cable is given a prolonged life because of diminished fatigue.

Other objects, features and advantages of the present invention will become apparent from the following detailed description given with reference to the accompanying drawings.

DESCRIPTION OF THE PREFERRED EMBODIMENT

Figure 1:
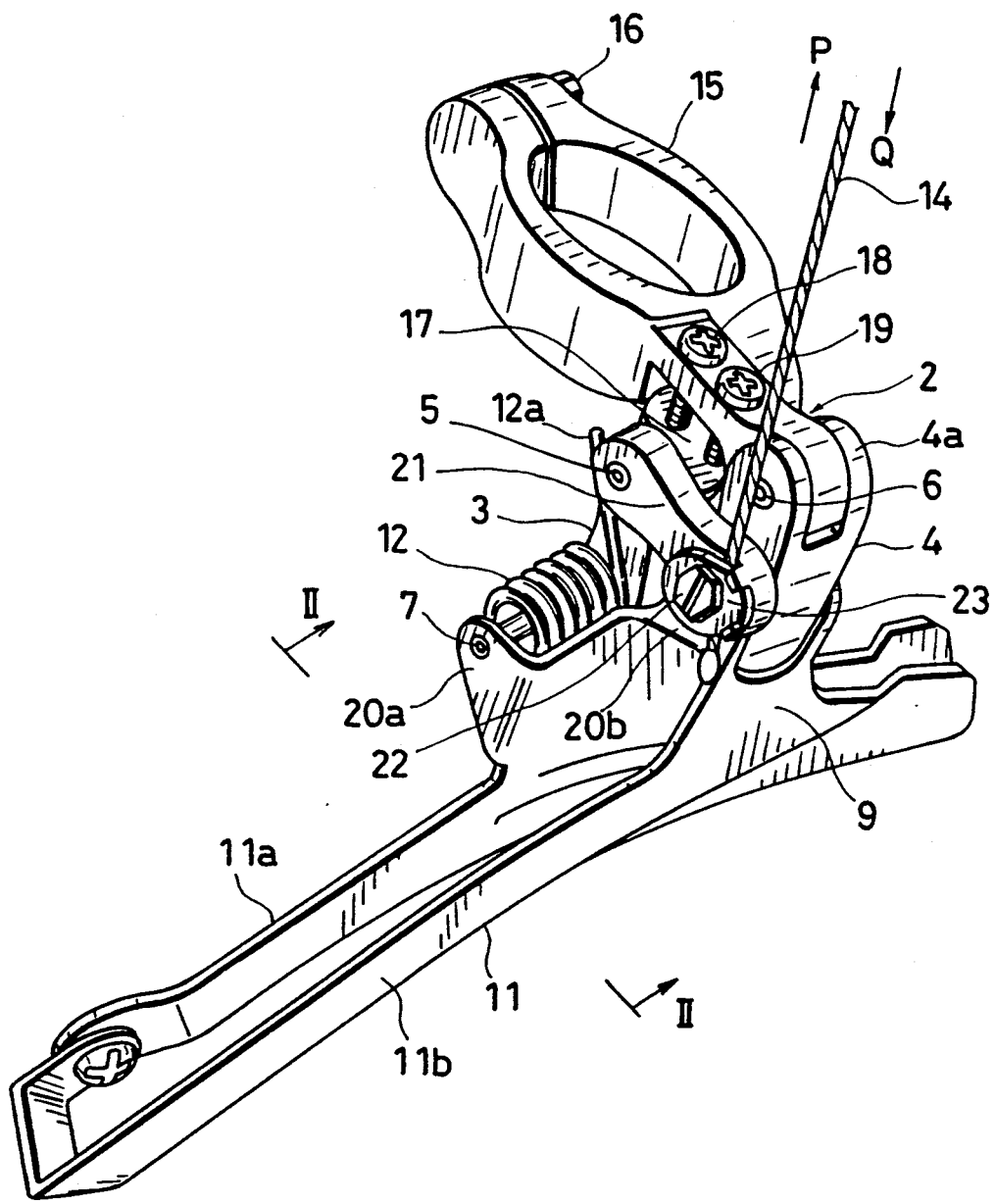
FIG. 1 is an overall perspective view showing an embodiment of the present invention.
Figure 2:
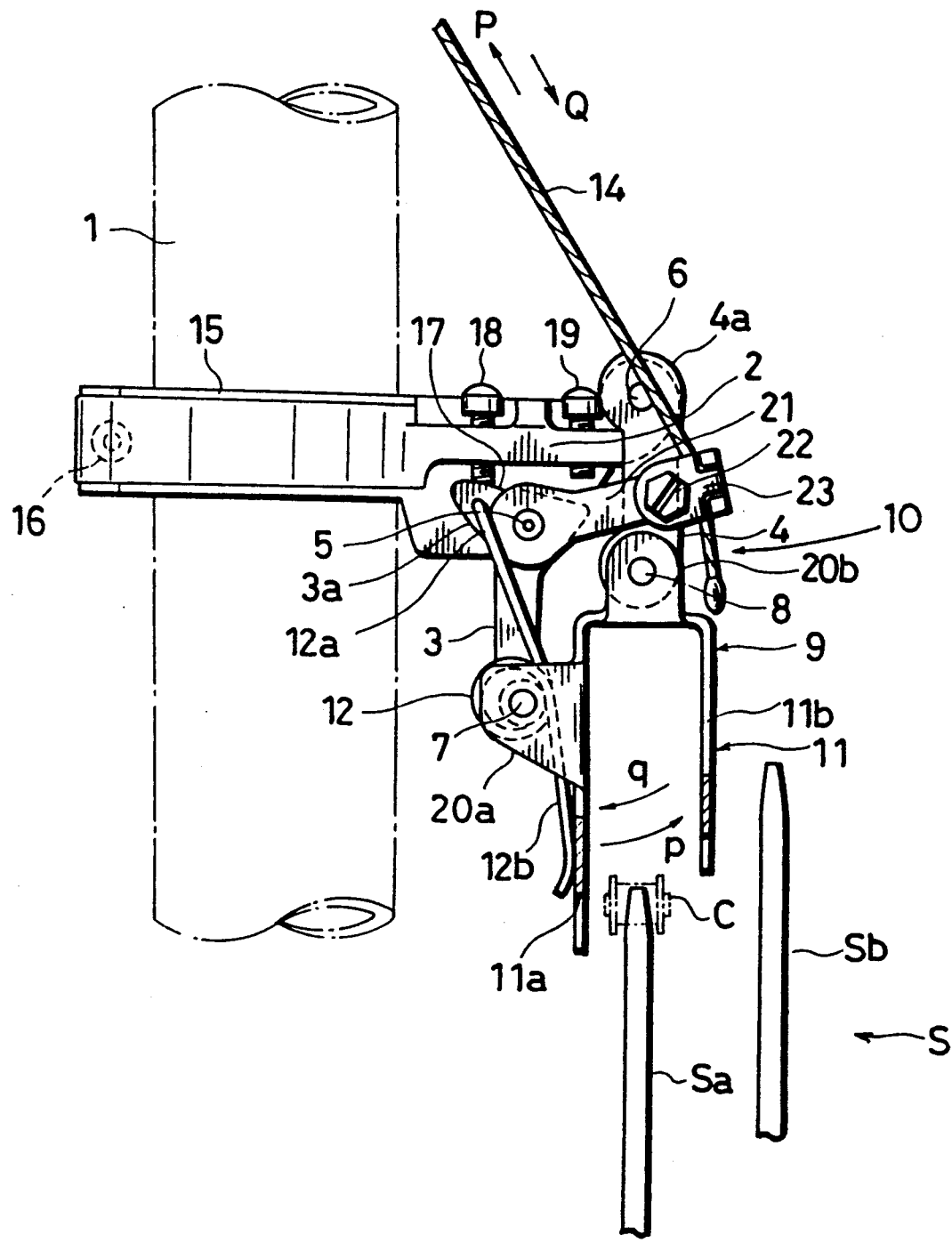
FIG. 2 is a view showing the embodiment as it is seen in the direction of arrows II—II in FIG. 1.
Figure 3:
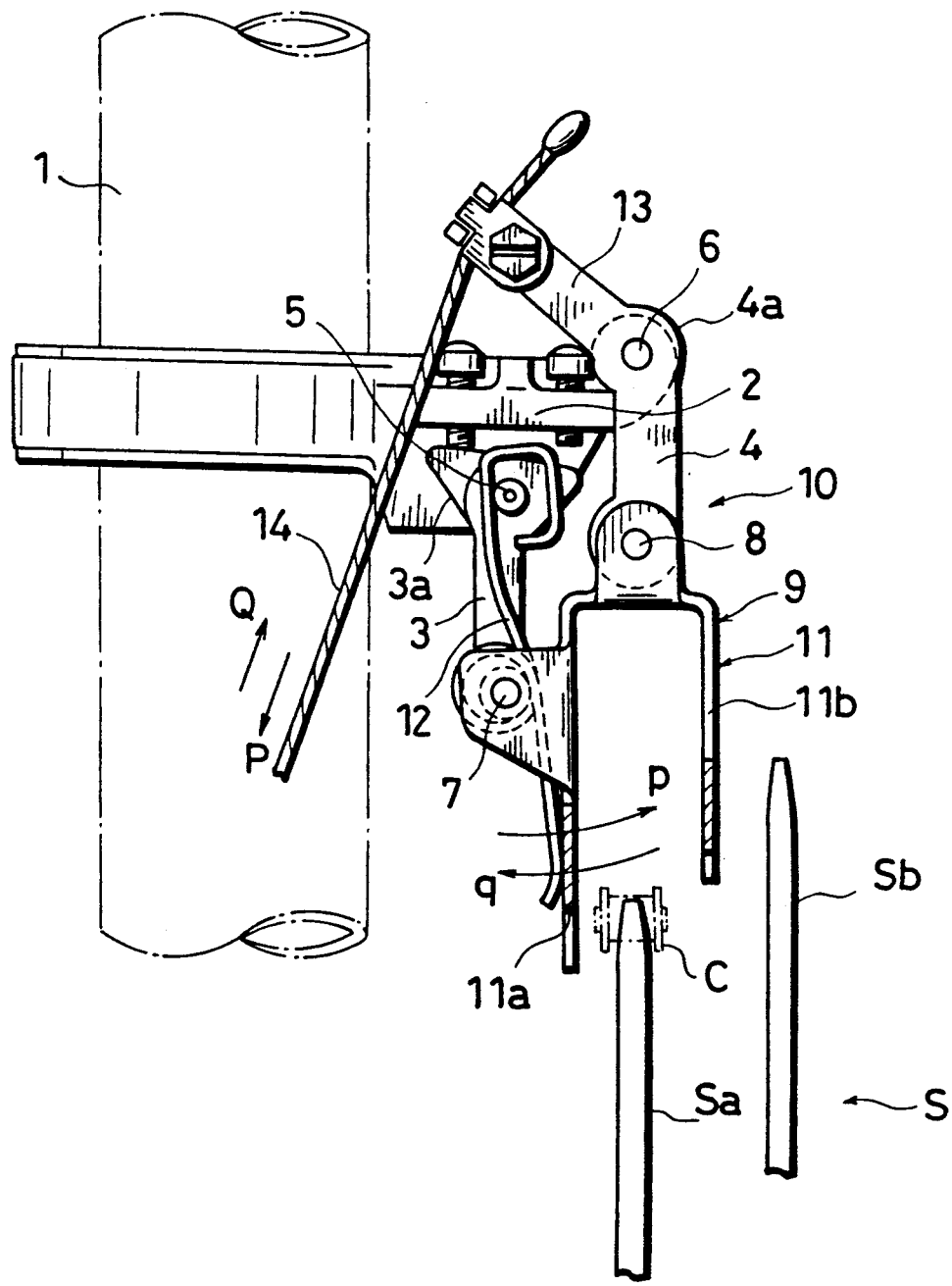
FIG. 3 is a view corresponding to FIG. 2 and showing a conventional front derailleur.

With reference to FIGS. 1 and 2, the preferred embodiment of the invention will be described below in detail. Throughout FIGS. 1 to 3, like parts are designated by like reference numbers or symbols.

The bicycle front derailleur shown in FIG. 2 is mounted on a lower portion of the seat tube 1 of the bicycle frame at a suitable level relative to a multiple chainwheel S, which comprises a smaller sprocket Sa closer to the bicycle frame and a larger sprocket Sb farther from the bicycle frame. The chainwheel S is mounted on an unillustrated pedal crank axle.

The front derailleur of the present invention comprises a base member 2 fixed to the seat tube 1, inner and outer link members 3, 4 having their respective upper ends connected to the base member 2 by pins 5, 6, to be pivotally movable laterally of the bicycle, and a movable member 9 pivotally connected to the lower ends of the respective link members 3, 4 by pins 7, 8, Thus, deformable parallelogrammatic pantographic link mechanism 10 is formed by these members 2, 3, 4, 9. The movable member a provides a chain guide 11 which comprises an inner guide plate 11a and an outer guide plate 11b.

The pins 5, 6, 7, 8 are arranged at the respective corners of a parallelogram when seen from behind the bicycle. Accordingly, when the link mechanism 10 deforms, the movable member 9 or the chain guide 11 translates along circular-arc loci centered about the pins 5, 6 connecting the link members 3, 4 to the base member 2 with the present embodiment, the pin 6 at the upper end of the outer link member 4 is positioned at a higher level than the pin 5 at the upper end of the inner link member 3 so as to position the movable member 9 or the chain guide 11 at a higher level as it moves toward the larger chainwheel Sb of the chainwheel S.

As seen in FIG. 1, the base member 2 has an annular clamp portion 15 which is locally split in the form of a slit to enable diametrical variation. The base member is fixed to the seat tube 1 with the clamp portion 15 gripping the seat tube 1 and fastened by tightening up a screw 16.

The inner link member 3 has at its upper end a stopper face 17 for restricting the range of pivotal movement of the link member 3, while a pair of adjusting screws 18, 19 extend through the base member 2 in screwthread engagement therewith and are adapted to bear at their lower ends on the stopper face 17. The adjustment of the screws 18, 19 makes it possible to vary the range of pivotal movement of the inner link member 3, and accordingly, the deformable range of the link mechanism 10. This also means that the displacement of the movable member 9 or chain guide 11 can be regulated and adjusted.

According to the present embodiment, the movable member 9 is formed by an inverted U-shaped member in the form of a single plate including the inner and outer guide plates 11a, 11b and interconnecting their upper ends. The lower ends of the respective link members 3, 4 are connected by the pins 7, 8 to lugs 20a, 20b projecting from the inner side and top side of the movable member 9, respectively.

The link mechanism 10 is always biased by a spring 12 so as to move the movable member 9 or the chain guide 11 laterally inward (in the direction of arrow q), i.e., toward the smaller sprocket Sa. According to the present embodiment, the spring 12, which is a coiled spring, is provided around the pin 7 connecting the inner link member 3 to the movable member 9. The spring has one end 12a engaging the inner link member 3, whereas the other end 12b bearing on the inner guide plate 11a to bias the link mechanism as stated above.

Further according to the present invention, the upper end of the inner link member 3 is an actuating arm 21 extending toward the outer link member 4. The actuating arm is integral or rigid with the inner link member 3 for integral movement therewith. A cable 14 has one end connected to the free end of the actuating arm 21. With the present embodiment, the cable 14 is connected to the actuating arm 21 by being clamped between the free end of the arm 21 and a holder 23 fastened to the arm end with a screw 22.

Preferably, the actuating arm 21 has such a length that the free end thereof should not project beyond the outer link member 4. However, no problem will arise even if the free end of the actuating arm 21 slightly projects outward beyond the outer link member 4 when the link mechanism 10 is in the returned position shown in FIG. 2, because when the actuating arm 21 is pivotally moved upward to deform the link mechanism 10, the outer link member 4 pivotally moves outward, conceal completely the free end of the arm from behind.

The cable 14 extends from the free end of the actuating arm 21 upward along the seat tube 1 and is connected to a shift lever mounted, for example, on the top tube of the bicycle frame. The shift lever can be a known one which moves the cable longitudinally thereof by pulling or paying out the cable.

The front derailleur of the construction described above operates as follows. When the unillustrated shift lever is manipulated to pull the cable 14 in the direction of arrow P with the pantographic link mechanism 10 in its restored state of FIG. 2, the actuating arm 21 moves about the pin 5 counterclockwise in FIG. 2, thereby deforming the link mechanism 10 against the elastic force of the spring 12 so as to translate the movable member 9 or the chain guide 11 laterally outward (in the direction of arrow p). This movement causes the inner guide plate 11a of the chain guide 11 to push a chain C out of engagement with the smaller sprocket Sa into engagement with the larger sprocket Sb.

Conversely, when the unillustrated shift lever is manipulated reversely to pay out the cable 14 in the direction of arrow Q from the above pulled state in which the movable member 9 or the chain guide 11 is positioned immediately above the larger sprocket Sb, the link mechanism 10 is deformed by the restoring force of the spring 12 acting thereon while being regulated by the pay-out amount of the cable 14 so as to translate the movable member 9 or the chain guide 11 laterally inward (in the direction of arrow q) This movement causes the outer guide plate 11b of the chain guide 11 to push the chain C out of engagement with the larger sprocket Sb into engagement with the smaller sprocket Sa.

Thus, with the front derailleur of the present invention, the cable 14 for deforming the pantographic link mechanism 10 is attached to the actuating arm 21 extending from the upper end of the inner link member 3 of the link mechanism 10 toward the outer link member 4, so that the actuating arm forms no upward projection beyond the link mechanism, while the cable can be made to extend upward. Thus, it is possible to eliminate the problems which have been encountered when the actuating arm projects upwardly beyond the link mechanism and when the cable is arranged to extend upward.

The present invention is not limited to the foregoing embodiment, but various modifications or alterations based on the principle defined in the appended claims are all included within the scope of the claims.

What is claimed is:

1. A bicycle front derailleur for selectively shifting a chain from one sprocket to another of a multiple chainwheel, the front derailleur comprising a parallelorgrammatic pantographic link mechanism which includes:

a base member fixable to a suitable portion of a bicycle frame;

an inner link member located laterally closer to a bicycle frame, the inner link member having an upper end pivotally connected to the base member by a first pin for pivotal movement laterally of the bicycle;

an outer link member located laterally farther from the bicycle frame than the inner link member, the outer link member having an upper end pivotally connected to the base member by a second pin for pivotal movement laterally of the bicycle; and a movable member pivotally connected to respective lower ends of the inner and outer link members by third and fourth pins, the movable member being provided with a chain guide including an inner guide plate and an outer guide plate, the inner and outer guide plates being opposed to each other with the chain positioned therebetween;

wherein the link mechanism is biased by a spring so as to return the movable member laterally inward; and wherein the inner link member is provided with an actuating arm extending laterally outwardly toward the outer link member, the actuating arm being pivotable integrally with the inner link member, the actuating arm having a free end connected to a cable for pulling the actuating arm upward.

2. The front derailleur of claim 1, wherein the second pin is positioned at a higher level than the first pin, the actuating arm extneidng below the second pin.

3. The front derailleur of claim 2, wherein the actuating arm extends across an immediate portion of the outer link member.

4. The front derailleur of claim 1, wherein at least a portion of the actuating arm is located within a parallelogram formed by the link mechanism.

5. The front derailleur of claim 1 wherein the actuating arm extends in a plane which is displaced, in the extending direction of the respective pins, from another plane containing the inner and outer link members.

6. The front derailleur of claim 1, wherein the spring is a coiled spring provided around the third pin connecting the inner link member to the movable member, one end of the coiled spring engaging the actuating member, the other end of the coiled spring bearing against the chain guide.

7. The front derailleur of claim 1, wherein the movable member and the chain guide are integrally formed.

8. The front derailleur of claim 1, wherein at least a portion of the cable connected to the actuating arm is non-sheathed.

9. The front derailleur of claim 1, wherein the actuating arm extends from an upper end of the inner link member.

* * * * *